United States Patent
Hammond

(10) Patent No.: US 10,731,893 B2
(45) Date of Patent: Aug. 4, 2020

(54) HEATING UNIT

(71) Applicant: CCM RESEARCH LIMITED, London (GB)

(72) Inventor: Peter Hammond, Hailey (GB)

(73) Assignee: CCM RESEARCH LIMITED, London (GB)

( * ) Notice: Subject to any disclaimer, the term of this patent is extended or adjusted under 35 U.S.C. 154(b) by 2 days.

(21) Appl. No.: 15/520,164

(22) PCT Filed: Oct. 19, 2015

(86) PCT No.: PCT/GB2015/053094
§ 371 (c)(1),
(2) Date: Apr. 19, 2017

(87) PCT Pub. No.: WO2016/063017
PCT Pub. Date: Apr. 28, 2016

(65) Prior Publication Data
US 2017/0336097 A1    Nov. 23, 2017

(30) Foreign Application Priority Data
Oct. 20, 2014 (GB) .................................. 1418614.2

(51) Int. Cl.
F24H 1/10 (2006.01)
C09K 5/16 (2006.01)
F24V 30/00 (2018.01)
F24S 90/00 (2018.01)
F24D 17/00 (2006.01)

(52) U.S. Cl.
CPC ................ *F24H 1/10* (2013.01); *C09K 5/16* (2013.01); *F24D 17/0036* (2013.01); *F24S 90/00* (2018.05); *F24V 30/00* (2018.05); *Y02B 10/20* (2013.01); *Y02B 10/70* (2013.01)

(58) Field of Classification Search
USPC .......................................................... 122/19.1
See application file for complete search history.

(56) References Cited

U.S. PATENT DOCUMENTS

| 9,115,913 B1 * | 8/2015 | Rossi ...................... F24V 30/00 |
| 9,751,039 B2 * | 9/2017 | Gebald .............. B01D 53/0446 |
| 2011/0077447 A1 * | 3/2011 | Groothuis .......... B01D 53/1425 585/823 |
| 2012/0076711 A1 | 3/2012 | Gebald et al. |

(Continued)

FOREIGN PATENT DOCUMENTS

| EP | 1975219 A2 | 10/2008 |
| GB | 2010468 A | 6/1979 |

(Continued)

OTHER PUBLICATIONS

GB Combined Search & Examination Report for GB Application No. 1418614.2, dated Jan. 13, 2016, 6 pages.

(Continued)

*Primary Examiner* — Grant Moubry
*Assistant Examiner* — John E Bargero
(74) *Attorney, Agent, or Firm* — Hoffman Warnick LLC

(57) ABSTRACT

A heating unit comprising: —a housing —amino-carrying fibres contained within the housing; —a conduit for water; —means for delivering carbon dioxide into the housing; and —means for supplying heat to the amino-carrying fibres.

9 Claims, 2 Drawing Sheets

(56) References Cited

U.S. PATENT DOCUMENTS

Figure 1:
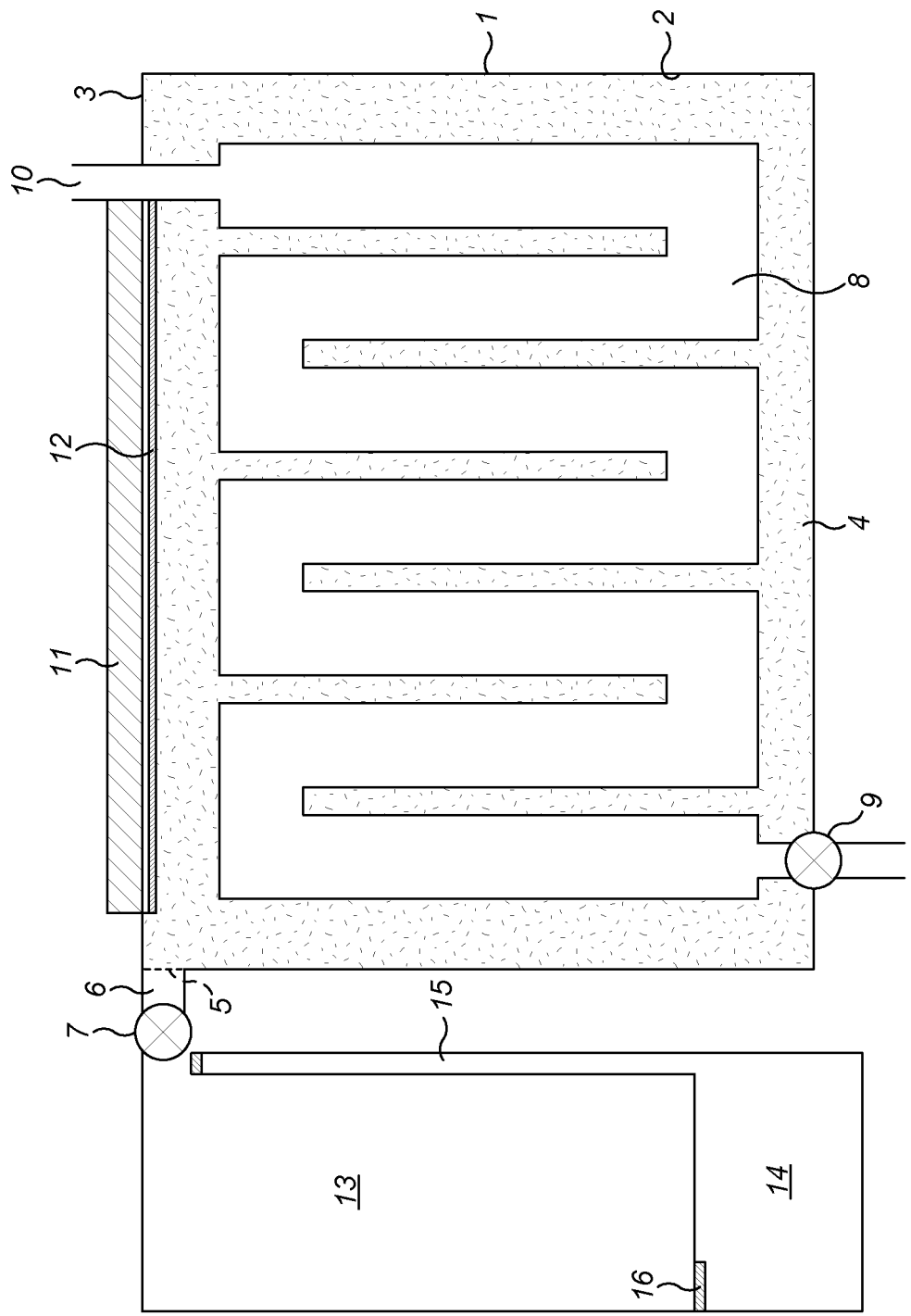

2015/0076711 A1     3/2015   Blanchard et al.
2016/0123309 A1*   5/2016   Huang .................... F03G 6/003
                                                                                             60/641.8

FOREIGN PATENT DOCUMENTS

| GB | 2446820 A | 8/2008 |
| GB | 2474249 A | 4/2011 |
| JP | S55152394 A | 11/1980 |
| WO | 2014033456 A1 | 3/2014 |

OTHER PUBLICATIONS

International Search Report & Written Opinion for International Application No. PCT/GB2015/053094, dated Jan. 25, 2016, 10 pages.
International Preliminary Report on Patentability & Written Opinion for International Application No. PCT/GB2015/053094 dated May 4, 2017, 8 pages.

* cited by examiner

HEATING UNIT

The present invention relates to a heating unit for heating water. In particular the invention relates to a domestic heating unit having an improved environmental profile and/or provides hot water at a reduced cost.

Heating of water for domestic use either for direct use of the hot water or for use in central heating systems represents a major proportion of energy consumption in many countries. Due to the known problems of global warming there is an ever increasing need to reduce energy consumption, especially when energy is obtained from fossil fuels.

A problem with many non-fossil fuel methods of providing heat energy, for example from solar power or wind power, is that it is very difficult to store energy for use at a later time.

Heating water especially for use in central heating systems is a significant expense for many households, especially during winter months in countries with colder climates. The cost of electricity is sometimes less expensive during off-peak hours. However these are not the times when most people want to heat their homes. Methods in which heat can be stored are thus often economically advantageous.

The present invention seeks to provide a simple heating unit which can be used to provide hot water which overcomes one or more disadvantages of the prior art.

According to a first aspect of the present invention there is provided a heating unit comprising:
  a housing;
  amino-carrying fibres contained within the housing;
  a conduit for water;
  means for delivering carbon dioxide into the housing; and
  means for supplying heat to the amino-carrying fibres.

According to a second aspect of the present invention there is provided a method of heating water, the method comprising:
  (a) providing a heating unit of the first aspect;
  (b) delivering carbon dioxide into the housing; and
  (c) passing water through the conduit.

The heating unit of the present invention comprises a housing. This is essentially a container which holds amino-carrying fibres. The shape, size and type of material used to make the housing can vary. The housing suitably has solid air-tight walls. It may be made of any suitable material. Suitable materials include plastic, wood, glass, ceramic, concrete and metal. Preferably the housing is made of plastic.

Suitable plastic materials will be known to the person skilled in the art and include, for example, epoxy coatings and high density and low density polyethylene.

Suitable metal materials include stainless steel.

The housing has an external surface and an internal surface. The external surface may suitably be weatherproof. The internal surface may suitably reflect heat.

Located within the housing in heating unit of the present invention are amino-carrying fibres. By this we mean to a fibrous material which is impregnated with or coated with an amino compound.

Any suitable fibres could be used, for example synthetic sponge fibres and other solid fibrous matrices. Preferably the amino-carrying fibres are cellulosic fibres material. Suitable cellulosic fibres include natural cellulosic fibres and semi-synthetic or processed cellulosic fibres.

The fibres may comprise natural fibres and/or synthetic fibres and/or semi-synthetic fibres, for example regenerated cellulose products. Suitable synthetic fibres include polyamides, polyesters and polyacrylics. Preferably the material comprises natural fibres.

Preferably the cellulosic fibres comprise natural cellulosic fibres.

Suitable natural cellulosic fibres for use herein include cotton, hemp, flax, silk, jute, kenaf, ramie, sisal, kapok, agave, rattan, soy bean, vine, banana, coir, stalk fibres and mixtures thereof.

In some preferred embodiments the cellulosic fibres comprise a waste product or a by-product from agriculture. Such cellulosic fibres would otherwise have little or no value in other applications. Suitable waste products or by-products may be derived from the stems, leaves, chaff or husks of crops, for example cereals or rapeseed. Most preferably the cellulosic fibres are from straw or wood pulp.

In some embodiments the cellulosic fibres may be from refined wood pulp, for example the material sold under the trade mark TENSEL.

In some embodiments the cellulosic fibres may be the waste directly obtained from pulp mills, for example pine pulp.

In some embodiments the cellulosic fibres may be a straw material obtained from cereals, for example wheat, rye or barley.

The cellulosic fibres are suitably provided as a finely divided particulate material. Suitably the fibres have an average particle size of at least 10 microns, preferably at least 50 microns, more preferably at least 100 microns. The cellulosic fibres may have an average particle size of at least 0.2 mm, preferably at least 0.5 mm. The cellulosic fibres may have an average particle size of up to 10 cm, suitably up to 5 cm, preferably up to 1 cm, more preferably up to 0.5 cm.

In especially preferred embodiments the cellulosic fibres have an average particle size of from 0.5 to 3 mm.

Average particle size may suitably be measured by conventional sieving techniques.

The fibres are amino-carrying fibres. By this we mean that the fibres carry any amino compound. Suitably the amino compound is retained on the surface of the fibres.

An amino-carrying fibre may be prepared by any suitable method. Such methods will be known to those skilled in the art and include for example immersing the fibres in a liquid composition comprising the amino compound, spraying the amino compound onto the fibres etc.

Suitably there is an interaction between the surface of the fibres and the amino compound. For example this may be a simple electrostatic interaction, a dipole-dipole interaction, hydrogen bonding, or a full covalent bond. Without being bound by theory, it is believed that there is hydrogen bonding between the amino functionality and the surface of the fibres.

The amino compound may be selected from any compound containing an amino or substituted amino moiety, for example ammonia, an aliphatic or aromatic amine, an amide or urea. Preferably the amino compound is selected from ammonia or an amine.

In some preferred embodiments the amino compound comprises ammonia. By this we mean to include ammonium hydroxide, (i.e. from an aqueous ammonia composition).

Suitable amino compounds include natural compounds and synthetic compounds. A mixture of two or more amino compounds may be carried on the fibres.

Suitable amines include aromatic and aliphatic amines. These amines may be substituted or unsubstituted. Examples of suitable amines include amino acids, alkanolamines, alkyl amines and alkenyl amines. Especially preferred amines for use herein are alkyl amines and alkanolamines.

The amino compound may be selected from ammonia, a primary amine, a secondary amine or a tertiary amine. Some preferred amines are primary amines, secondary amines, or mixtures thereof. Some especially preferred amines for use herein are primary or secondary alkyl amines, especially alkyl amines having up to 12 carbon atoms, more preferably up to 4 carbon atoms. Preferred amines include methylamine, dimethylamine, ethylamine, diethylamine, propylamine, dipropylamine, butylamine, dibutylamine and mixtures and isomers thereof.

Some especially preferred amino compounds are alkanolamines. Examples of suitable alkanolamines include ethanolamine, 2-(methylamino)ethanol, diethanolamine, 2-amino-2-methyl-1-propanol and diisopropanolamine. One particularly preferred compound is 2-amino-2-methyl-1-propanol.

Suitably the amino compound is a compound of formula $R^1R^2R^3N$ wherein each of $R^1$, $R^2$, and $R^3$ is independently selected from hydrogen, an alkyl group and a group of formula HO—X— where X represents an alkylene group. Preferably each of of $R^1$, $R^2$, and $R^3$ is independently selected from hydrogen, an alkyl group having 1 to 10 carbon atoms, and a group of formula HO—X— where X represents an alkylene group having 1 to 10 carbon atoms. Preferably each of of $R^1$, $R^2$, and $R^3$ is independently selected from hydrogen, an alkyl group having 1 to 4 carbon atoms, and a group of formula HO—X— where X represents an alkylene group having 1 to 4 carbon atoms.

Suitably the weight ratio of the amino compound to the fibres at least 0.1:1, preferably at least 0.5:1, more preferably at least 1:1.

Suitably in step (a) the weight ratio of amino compound to fibres is up to 100:1 (amino compound fibres), preferably up to 50:1, more preferably up to 20:1, for example up to 15:1.

In some especially preferred embodiments the fibres carry from 1.5 to 5, preferably from 2 to 3 parts by weight of an amino-compound.

The heating unit of the present invention comprises means for delivering carbon dioxide into the housing. In use when carbon dioxide is delivered into the housing it reacts with the amine on the fibres in an exothermic reaction.

The carbon dioxide may be provided as neat carbon dioxide. This may be provided as carbon dioxide gas, as supercritical carbon dioxide or as solid carbon dioxide. In preferred embodiments the carbon dioxide is in gaseous form.

In some embodiments the carbon dioxide may be mixed with other gaseous components, for example nitrogen or sulfur dioxide.

The means for delivering carbon dioxide into the housing is suitably a valve which can be opened and closed to control the flow of carbon dioxide.

In some embodiments carbon dioxide from the direct combustion of a fossil fuel may be directed to flow into the unit.

Preferably the flow of carbon dioxide into the housing is carefully controlled. In some preferred embodiments the heating unit comprises a vessel for storing carbon dioxide connected to the housing.

The heating unit of the present invention has a conduit for water. In some preferred embodiments the conduit passes through the amino-carrying fibres.

The conduit is suitably shaped to provide a large surface area to volume ratio so that it presents a large surface area to the amino-carrying fibres. When the fibres are contacted with carbon dioxide, an exothermic reaction occurs and the heat generated heats the water in the conduit.

The portion of the conduit which is located in the housing may comprise a plurality of plates, fins, coils, narrow tubes etc. to ensure maximum contact with the fibres and thus maximum heat exchange. The conduit may be arranged such that the water passes multiple times through the housing and/or the conduit may split into multiple channels on entry to the housing and then re-join when exiting.

Thus the present invention suitably provides a housing comprising amino-carrying fibres through which a conduit for water passes. When carbon dioxide is allowed to enter the housing an exothermic reaction occurs which heats the water in the conduit.

In some alternative embodiments the conduit for water does not pass through the fibres but passes along the top of the fibres. In such embodiments the water in the conduit is suitably heated by heat transfer from a plurality of heat tubes which do pass through the fibres.

Heat tubes are heat-transfer devices made from a thermally conductive solid and which contain a liquid. Whet the heat tubes are heated (in this case through contact with the fibres), the liquid vaporises and rises to the top of the heat tube. The top of the heat tube is suitably on contact with the conduit for water. The vapour condenses at the top of the tube and latent heat is provided to the water thereby heating the water.

In such embodiments the heating unit of the present invention suitably comprises a conduit for water which is in contact with one or more heat tubes wherein the heat tubes pass through the fibres.

Thus the present invention provides a heating unit comprising:
  a housing
  amino-carrying fibres contained within the housing;
  a conduit for water which passes through the fibres or is in contact with one or more heat tubes that pass through the fibres;
  means for delivering carbon dioxide into the housing; and
  means for supplying heat to the amino-carrying fibres.

Heat tubes will be well known to the person skilled in the art.

The carbon dioxide may be provided along with a diluent or carrier. Preferably it is provided without the addition of a diluent or carrier. Minor impurities may be present.

The carbon dioxide is preferably provided at a pressure of from 500 to 1500 kPa. In some embodiments carbon dioxide may be delivered at ambient pressure, and preferably at ambient temperature. In preferred embodiments the carbon dioxide gas is at a supra-atmospheric pressure.

The uptake of carbon dioxide on the cellulosic material is preferably at least 1% omf, preferably at least 5% omf, more preferably at least 10% omf, for example at least 15% omf.

The uptake of carbon dioxide on the cellulosic material may be up to 100% omf, suitably up to 80% omf, preferably up to 60% omf, preferably up to 40% omf, for example up to 30% omf, or up to 25% omf.

By % omf (% on mass of fibre) we mean to refer to the mass of carbon dioxide as a percentage of the mass of fibres contacted with the composition comprising carbon dioxide.

For the avoidance of doubt, the above amounts refer to the increase in weight of the amino carrying fibres.

When carbon dioxide is delivered into the housing it becomes reversibly bound to the fibres. Thus the carbon dioxide may be released from the fibres at a later time, by heating the fibres. However the amine suitably remains on the fibres allowing the fibres to be re-used. This is a key feature of the heating unit and method of the present invention.

When carbon dioxide is delivered into the housing the heat released in the exothermic reaction is used to heat water passing through the conduit. The rate of delivery of the carbon dioxide into the housing and the rate of flow of water through the conduit can be controlled to ensure the water is heated to the desired temperature. These may in some embodiments be controlled by a thermostat.

Once a certain amount of carbon dioxide has reacted with the amino compound on the fibres the rate of the exothermic reaction decreases and less and less heat is given out, until the fibres are eventually "saturated" and the reaction is complete. At this point the carbon dioxide needs to be driven off the fibres and out of the housing leaving the amine on the fibres free to react again in another exothermic reaction and heat more water.

Thus the heating unit of the present invention comprises means for supplying heat to the amino-carrying fibres.

In some embodiments the means for supplying heat to the amino carrying fibres may comprise solar panels.

In some embodiments the solar panels may be provided with covers so that carbon dioxide is not driven off when it is desired to heat water.

In some embodiments the means for supplying heat to the fibres may comprise an entrance valve and exit port through which warm air or other gas can be blown through the fibres. For example heat-generated from a traditional fossil fuel-burning boiler, fire or oven could be directed through the fibres.

In some embodiments the means for supplying heat to the fibres may comprise an electric hotplate or filament.

In some embodiments the means for supplying heat may comprise a further hot-water based heating circuit.

It is intended that the heating unit of the present invention can be integrated with the existing water heating system of a property. The heating unit of the present invention is particularly useful for heating water in a domestic environment. Typically the heating unit has a volume of about 0.5 to 2 $m^3$, suitably about 1 $m^3$. However it will be appreciated that larger or multiple units could be provided for larger buildings such as hospitals or hotels. The system can be used to heat water as required and when the fibres are "saturated" with carbon dioxide, the hot water supply can revert to a traditional fossil-fuel powered boiler. Excess heat generated from such a boiler could be used to drive off carbon dioxide from the "saturated" fibres and regenerate the heating unit of the invention.

In some embodiments the heating unit of the invention can be used as a "storage" heater: carbon dioxide could be driven off by heating the fibres during non-peak hours when energy is less expensive and then used to heat water needed during peak hours.

In especially preferred embodiments the heating unit can be used to provide a major portion of the hot water needed in a typical household during normal use. Preferably carbon dioxide can be driven off from the fibres by heat or electricity provided by a renewable source, for example wind or solar energy.

The carbon dioxide which is driven off from the fibres may be released into the atmosphere. This may be appropriate, for example, in embodiments in which the carbon dioxide is provided directly from the combustion of a fossil fuel.

In preferred embodiments the carbon dioxide is redirected into the vessel connected to the housing and stored until it is needed again. This may suitably be achieved by providing a further reduced pressure chamber and/or a pump.

Thus in preferred embodiments the heating unit of the present invention comprises a closed loop for carbon dioxide. The same carbon dioxide is repeated allowed to react with the fibres and then is driven off in a subsequent heating step, and stored until it is needed again.

The present invention may allow heat from renewable sources or off-peak electricity to be effectively "stored" as carbon dioxide for release as heat energy in an exothermic reaction at a later time.

The housing may be suitably be provided with a reflective interior surface. This is suitably to ensure that heat is not lost during heating of water or during removal of carbon dioxide.

The conduit provides a channel for water which is heated by directly passing through the fibres or via heat tubes. This water is then suitably directed into the hot water system of the domestic supply and can be used as hot water for washing etc. or can be used in a central heating system.

In some embodiments the heating unit may be divided into a plurality of separate chambers, each having a separate conduit and/or heat tubes. Carbon dioxide can be directed into one chamber causing an exothermic reaction and water can be passed through the conduit in that chamber. Excess heat may be used to drive off carbon dioxide from an adjacent chamber which has previously been used. When hot water is next needed the carbon dioxide can be directed to a different chamber. It will be appreciated that some additional heat will also need to be supplied at some point, for example through solar panels, but that excess heat from one chamber can help "regenerate" an adjacent chamber.

The invention will now be further described with reference to the accompanying drawings, which illustrate preferred non-limiting embodiments of the invention.

A heating unit of the invention is shown in FIG. 1. The unit is provided with an outer housing 1. This may be made from polyethylene, for example. The internal surface 2 is preferably made from a heat reflective material such as stainless steel. The outer surface 3 is preferably is weather resistant and may be made from polyethylene.

Located within the housing are fibres 4 coated with an amino compound. A grid 5 prevents the fibres entering a pipe 6 to valve 7. This is a two way valve connected to a cylinder of carbon dioxide 13.

Passing through the housing is a conduit 8 which bends multiple times through the fibres and presents a large surface area to the fibres. The fibres are packed around the bends of the conduit. Water enters the housing at inlet 9 and exits through outlet 10. Water is suitably supplied from and returned to the water heating system of a domestic supply with which the heating unit is integrated.

The unit is provided with a solar panel 11. A screen 12 can be remotely opened and closed when necessary to allow heat from the solar panel to be directed onto the fibres when desired.

Carbon dioxide that is driven off suitably passes back through valve 7 and is directed via channel 15 into chamber 14. From there it can be redirected into cylinder 13 via opening 16.

Figure 2:
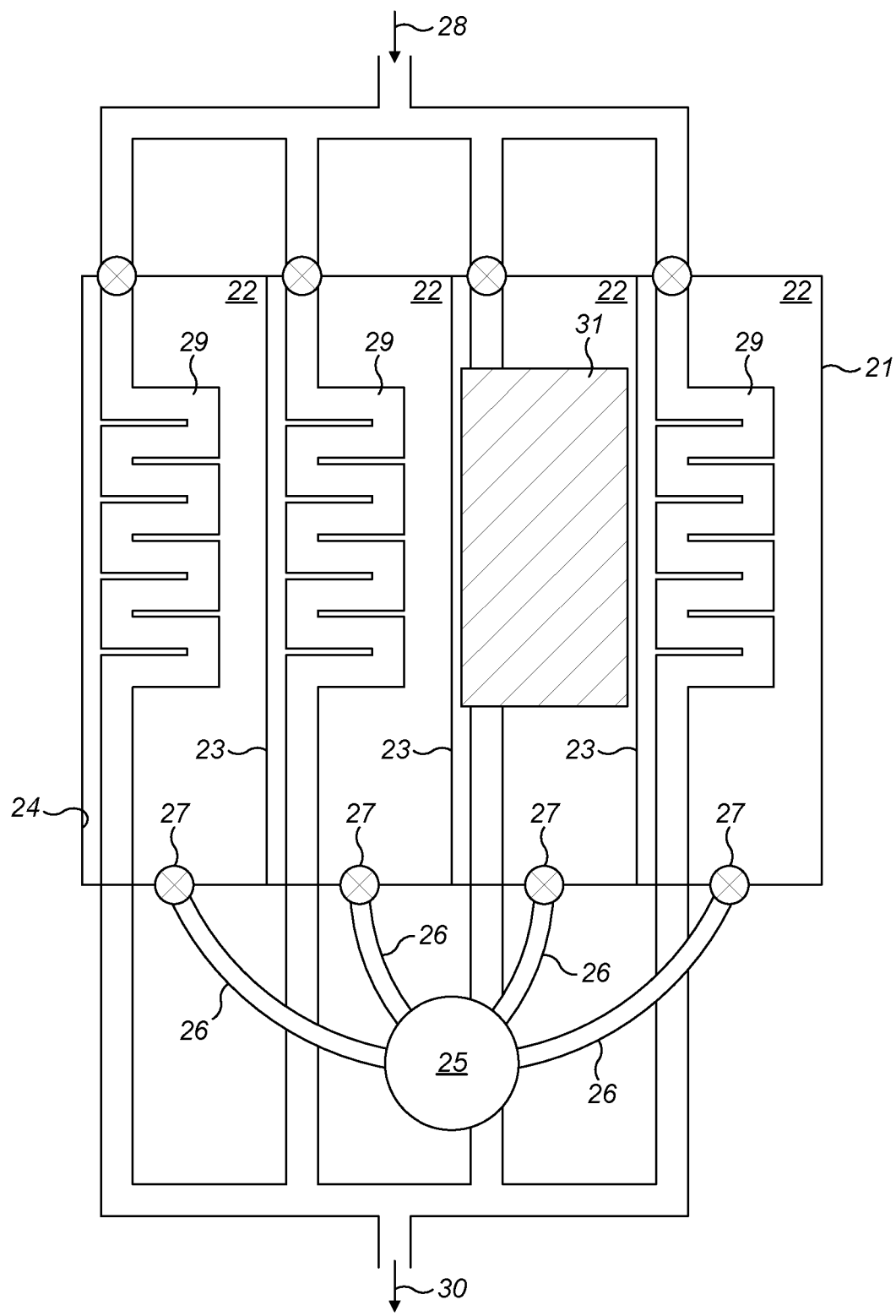

FIG. 2 shows a plan view of a further heating unit of the invention. Housing 21 is divided into four sub-chambers 22 each of which is packed with amine-carrying fibres (not shown). Internal dividing walls 23 are not heat reflective and gas-impermeable. The internal surface of the external wall 24 is heat reflective.

Carbon dioxide from a single source 25 can be directed via multiple channels 26 into any of the chambers via valves 27. Water enters from a single source 28 which is connected to the water supply and can be passed selectively through any of the chambers via a plurality of conduits 29 which join a single exit 30. Solar panel 31 can be moved across the different chambers as needed.

The invention claimed is:

1. A heating unit comprising:
a housing having:
  an outer surface; and
  an inner surface;
an inlet passing through the outer surface and the inner surface of the housing;
an outlet passing through the inner surface and the outer surface of the housing;
a conduit extending between and in communication with each of the inlet and the outlet, the conduit forming a plurality of bends within the housing;
amino-carrying fibres contained within the housing, the amino-carrying fibers being disposed adjacent an outer surface of the conduit and around the plurality of bends;
a heat source for delivering heat to the amino-carrying fibres;
a carbon dioxide source in communication with the housing via a two-way valve and delivering carbon dioxide into the housing and removing carbon dioxide from the housing when the amino-carrying fibers are heated by the heat source, wherein the carbon dioxide source includes a closed loop for carbon dioxide.

2. The heating unit according to claim 1 wherein the amino-carrying fibres are cellulose fibres.

3. The heating unit according to claim 1 wherein the amino compound carried on the fibres is an alkanolamine.

4. The heat unit according to claim 1 wherein the conduit is in contact with one or more heat tubes that pass through the fibres.

5. The heating unit according to claim 1, wherein the carbon dioxide source includes a vessel containing carbon dioxide.

6. The heating unit according to claim 1 wherein the heat source includes a solar panel.

7. A method of heating water, the method comprising:
(a) providing the heating unit according to claim 1;
(b) delivering carbon dioxide into the housing; and
(c) passing water through the conduit.

8. The method according to claim 7 which further comprises a step (d) of heating the amino-carrying fibres using the heat source.

9. The heating unit of claim 6, wherein the housing includes a plurality of sub-chambers and the solar panel is alternately moveable to reside adjacent one or more of the plurality of sub-chambers and deliver heat to the amino-carrying fibres within each of the adjacent plurality of sub-chambers.

* * * * *